United States Patent [19]

Ohmen

[11] Patent Number: 4,794,313
[45] Date of Patent: Dec. 27, 1988

[54] THREE ELEMENT DIGITAL CONTROL SYSTEM

[76] Inventor: Douglass J. Ohmen, 1220 Greenbrook Dr., Danville, Calif. 94526

[21] Appl. No.: 76,072

[22] Filed: Jul. 21, 1987

[51] Int. Cl.$^4$ ............................................. G05B 11/42
[52] U.S. Cl. ..................................... 318/610; 318/609
[58] Field of Search ................................ 318/610, 609

[56] References Cited
U.S. PATENT DOCUMENTS
4,146,270 3/1979 Nurmberger et al. ........... 318/610 X Primary Examiner—William M. Shoop, Jr.
Assistant Examiner—Saul M. Bergmann
Attorney, Agent, or Firm—Limbach, Limbach & Sutton

[57] ABSTRACT

A universal three-element digital control system is described which forms a proportional signal, an integral signal and a derivative (differential) signal from an error signal and combines such signals to provide a controlling output signal to a device being controlled. The error signal is the difference between the actual signal, representative of the actual condition of the device being controlled, and the setpoint, which is representative of the desired condition. The proportional signal is proportional to the error signal. The integral and differential signals can be approximated by combining the previous error signals with the present error signal. Offset and multiplying elements are provided by which each of the signals can be offset or proportionalized to customize the control system for a particular application.

26 Claims, 4 Drawing Sheets

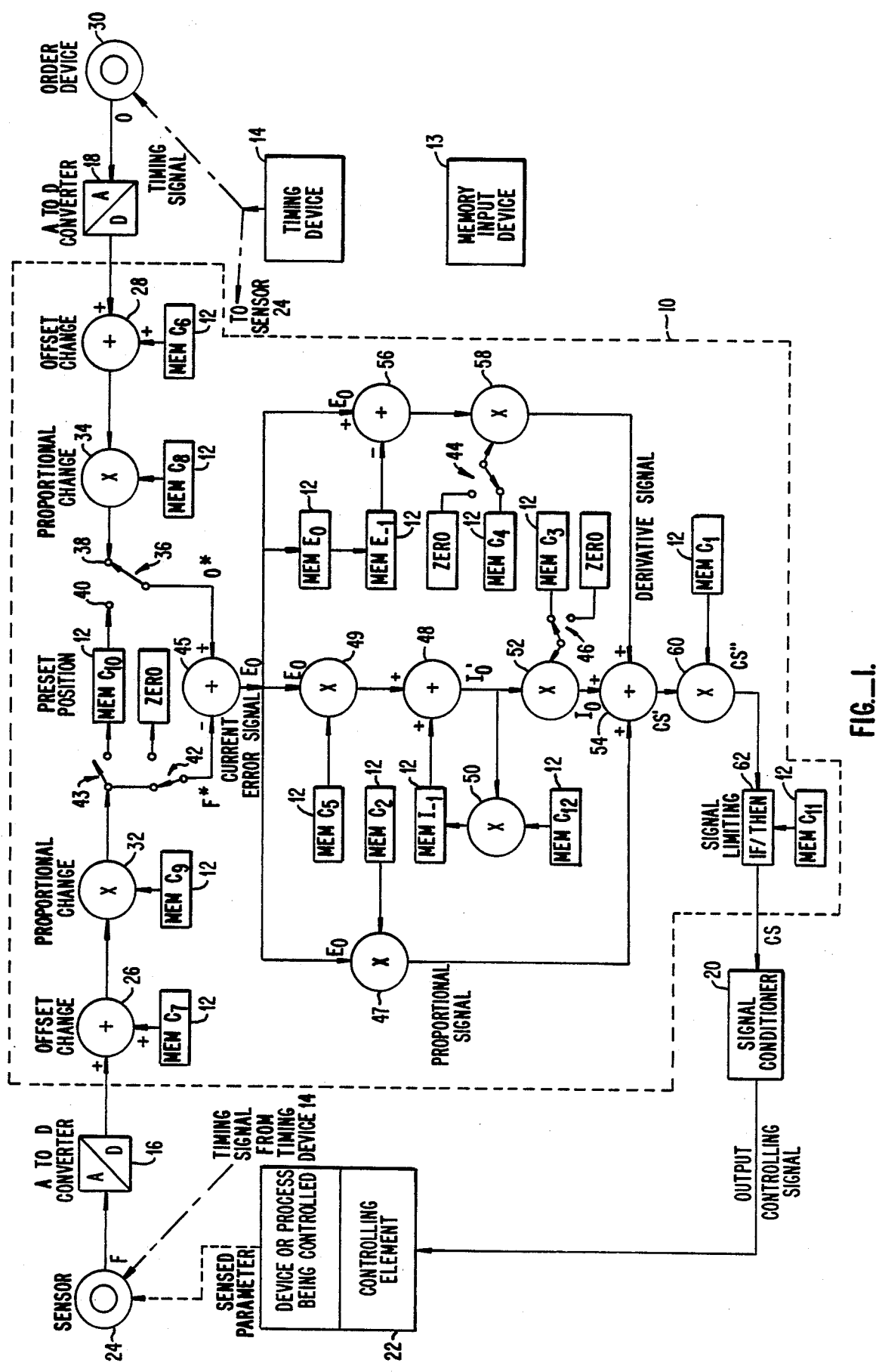
FIG._1.

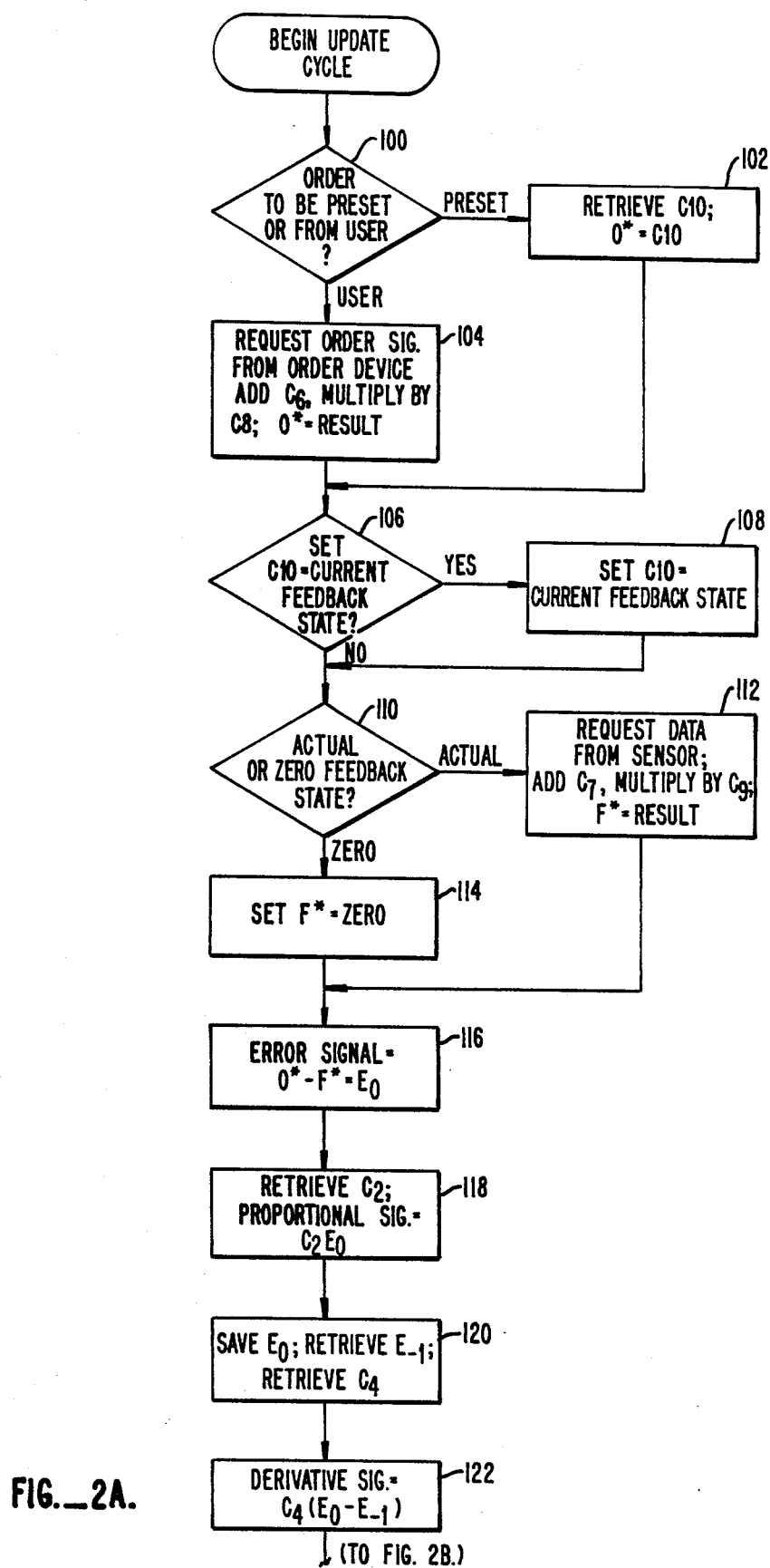
FIG._2A.

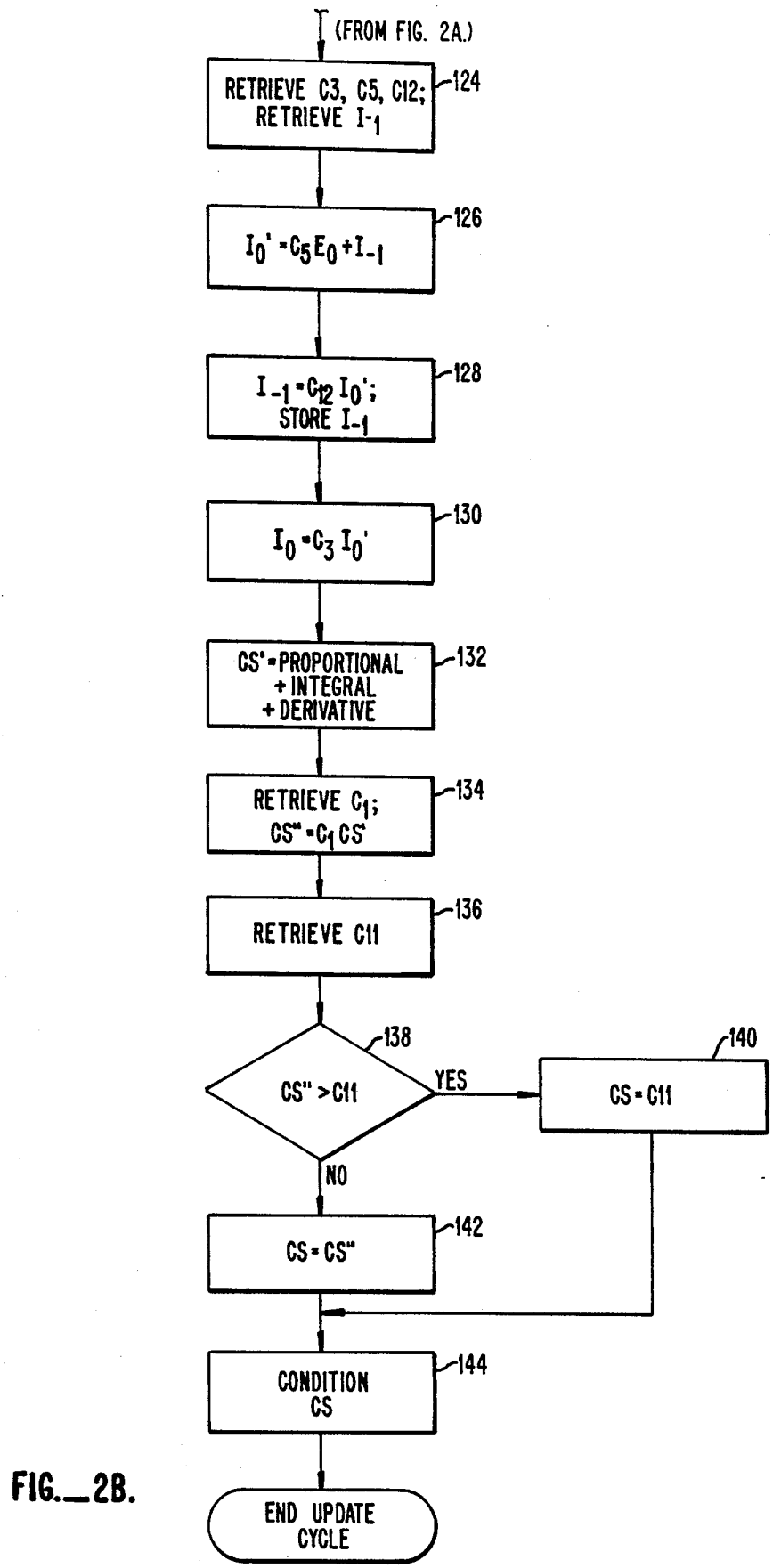
FIG._2B.

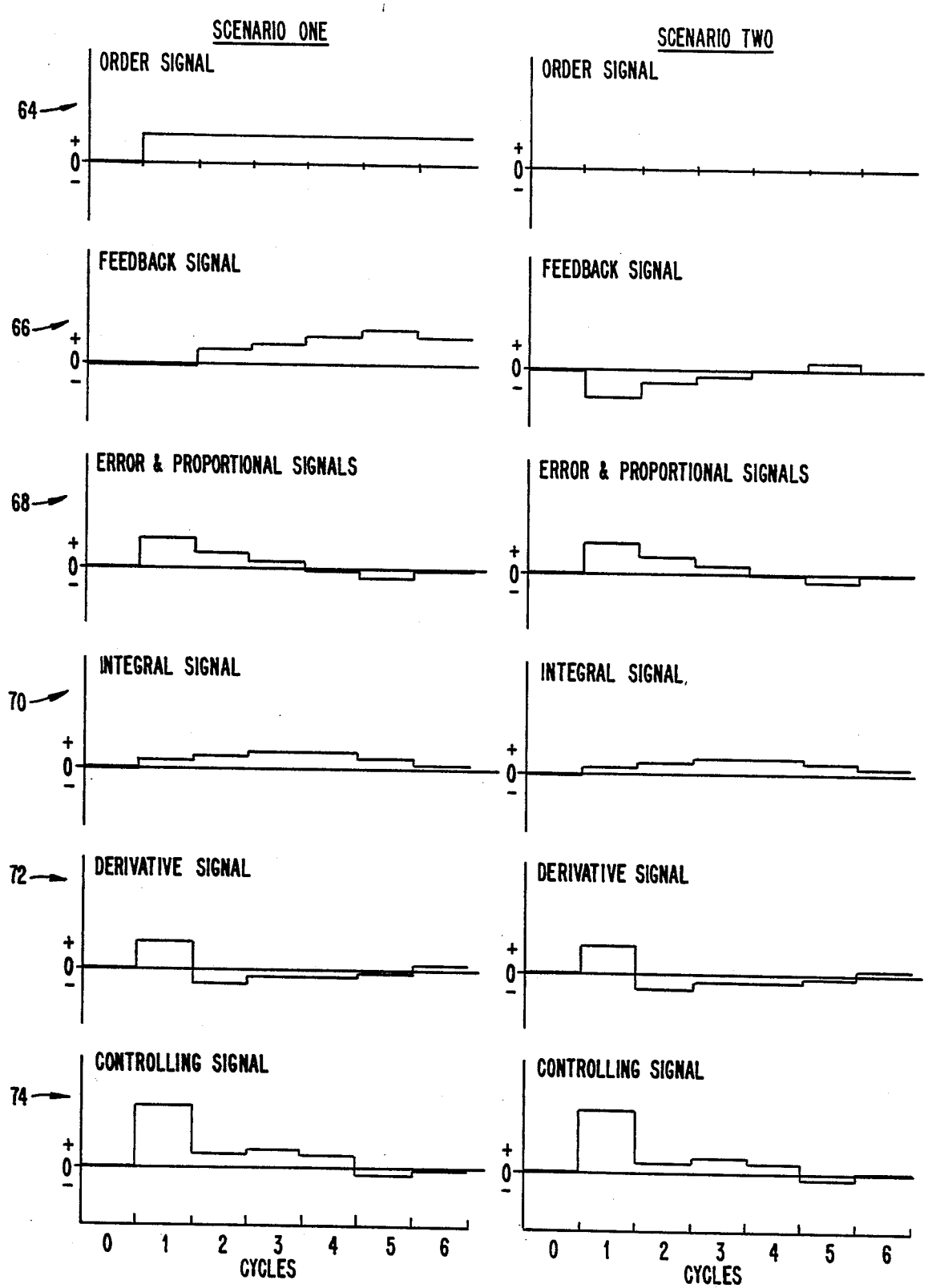
FIG._3.

THREE ELEMENT DIGITAL CONTROL SYSTEM

TECHNICAL FIELD

The present invention is directed, generally, to digital control systems, and more particularly to an improved digital proportional-integral-derivative control system.

BACKGROUND OF THE INVENTION

Proportional-integral-derivative control systems (P-I-D) are well known in the control system art, and are employed where precise control of a process or a condition of a machine is required. P-I-D control systems are designed to overcome permanent offsets which are common to simple proportional control systems, and to overcome the slow response times and overshoots found in the more complex proportional-integral control systems.

In simple control systems the error between the actual condition and the desired condition of a process or machine being controlled is used to directly drive a controlling element. The controlling element then urges the condition of the process or machine toward the desired state. In certain applications, especially in control systems controlling air or electrically driven elements, some amount of force must be left on the actuator just to counter resistive forces in the driven elements. This is true, for example, where air pressure is needed in a piston to support a weight, or an electric current is needed to maintain temperature in a process that would normally cool off. This is less true in a hydraulic cylinder, where the controlled item is an amount of high pressure liquid rather than the pressure of a compressible gas. Still, such systems can inherently include a "droop" in the condition being controlled that is somewhat proportional to the resisting force. This droop takes the form of a variable offset which may cause intolerable inaccuracies in the system.

Proportional-integral systems are employed to counter the variable offset problem of simple proportional systems. In such systems an integral term is added to the controlling signal determination. The integral term is the error compounded over time and then proportioned by a gain term. The integral term is added to the proportional signal to bring the machine or process closer to the desired condition or setpoint in an iterative manner. If an error still exists after the integral term is updated, the remaining error will again be integrated with the previous integral correction and again added to the proportional signal, thus bringing the condition a bit closer to the desired state.

As the controlled condition gets closer to the desired state or setpoint, the amount by which the integral term increases will get smaller, theoretically approaching zero as the error goes to zero. The integral signal will then remain at its current value and thereby hold the controlled device at its desired condition or setpoint. If the device being controlled overshoots the desired condition, the new error becomes negative and operates to reduce the magnitude of the integral term. As such, the effect of the integral term on the controlled device is reduced, which brings the controlled device back toward the desired condition or setpoint.

As mentioned above, among the problems of proportional-integral systems is slow response time and overshoots. The nature of an integration operation dictates that the impact of the integral term builds slowly as the sum of the existing error is built up. The rate of build-up can be increased by multiplying the integral by an appropriate gain term. However, if the gain term is set too high, overshoots can become a problem. Further, if the condition being controlled has an inertial component, an overshoot will be present.

The problem of overshoots and response time is addressed by P-I-D control systems, wherein a time derivative term is included to increase the initial response to an increasing error term and to reduce the rate at which the condition being controlled approaches the desired condition. The time derivative term, also known as the rate signal, is the derivative of the error with respect to time; i.e., the rate of change of the error. Thus, the derivative term is large when the amount of change is large, and small when the amount of change is small.

The time derivative term is introduced as a negative term in the controlling signal to slow down the rate at which the error is driven to zero. If the error is being reduced rapidly, the time derivative term will act to reduce the controlling signal and will slow down the rate at which the process approaches the setpoint. If the error term is constant, the derivative term is zero.

If the device being controlled is at the setpoint and is then rapidly driven off the setpoint by an external force, or the setpoint changes rapidly, the time derivative term will be immediately nonzero and start to urge the device being controlled back to the desired condition. This will happen before the error term alone which is present in the proportional signal term is large enough to significantly oppose the condition, and before the integral signal has had enough time to build up to increase the restoring signal.

When the controlling signal has built up enough to counter the offsetting force, the rate signal will, of course, have gone to zero. However, at that point, the integral signal will be building up at the maximum rate (since there is maximum error). The error will start to return towards zero. The time derivative of this return towards zero causes a non-zero rate signal to be generated which has an opposite polarity from when the error was increasing. This slows down the return to zero to prevent overshoot.

In a P-I-D system, then, the error of the system is increased by an integral signal which reflects the cumulative error over time, and decreased by a derivative signal which reflects the rate that the error is approaching zero. The integral signal prevents a permanent offset with the system never reaching zero error, while the derivative signal reduces the probability of overshoot. As such, a three element control system of the prior art can be modelled as follows:

$$\text{Output} = C_1(C_2 E + C_3 \int E \, dt - C_4 (dE/dt))$$

Where,
- Output = the signal that will go to the controlling element,
- $C_1$ = a constant for increasing or decreasing the magnitude of the Output,
- E = the error term: the numerical difference between the desired condition (or order signal) and the actual condition (or feedback signal),
- $C_2$, $C_3$, and $C_4$ = proportionalizing constants for the proportional term, the integral term, and the derivative term, respectively.

This form of P-I-D control system has been used to control positional equipment and other types of systems for many years. Reference is made to U.S. Pat. No. 4,430,698 to Harris in which such a P-I-D system is described in greater detail.

Until recently P-I-D control systems have been implemented in analog form. The article by J. Fishbeck, "Writing P-I-D Control Loops Easily in BASIC", *Control Engineer*, October, 1978, pp. 45-47, shows that P-I-D control systems can be implemented in digital form using a digital computer.

However, despite the recent advances in P-I-D control systems, such systems are typically custom designed for a particular application, and thus not resorted to in applications where cost and flexibility are of concern. Typically, current P-I-D control systems cannot be modified easily from one application to another. Thus, where a new controlling element being driven by the control system requires a different drive signal range or a particular offset, current P-I-D control systems may not be able to accommodate such requirements. Moreover, typical P-I-D control systems are designed around the sensor benng used to monitor the condition of the process or machine being controlled. As such, if it is desired that a different sensor be utilized, a substantial redesign of the system may be required.

Further, present P-I-D control systems continue to have inaccuracies which are not easily remedied with current P-I-D architectures.

Moreover, present P-I-D systems cannot be easily adapted to changing conditions of the process or machine being controlled.

SUMMARY OF THE INVENTION

These and other problems and disadvantages of previous P-I-D control systems are overcome by the present invention of an improved three element digital control system method and apparatus for controlling a parameter in a machine or process by driving a controlling element. The control system is of the type which senses the parameter to be controlled and provides a sensed parameter signal representative thereof, forms an error signal which is the difference between the sensed parameter signal and an order signal, and forms a driving signal for driving the controlling element. The driving signal includes a component which is proportional to said error signal, a component which is proportional to a time integral of said error signal, and a component which is proportional to a time derivative of said error signal. The improvement includes means for preprocessing the error signal prior to forming the driving signal. This preprocessing can include providing an offset or a proportionalizing gain factor to components of the error signal.

The improvement also includes postprocessing the driving signal prior to supplying it to the controlling element. Such post processing can take the form of a signal level limitation to prevent the controlling element from being overdriven.

Preferably, the present invention is implemented in digital form so that the multiplication and addition operations can be more easily implemented and more precisely controlled. As such, the values used in the offsetting and proportionalizing operations can be stored in memory and changed easily.

The preferred embodiment of the present invention can be modelled as follows:

$$CS = \begin{cases} C_1[C_2E_0 + C_3(C_5E_0 + C_{12}I_{-1}) + C_4(E_0 - E_{-1})] \\ >> \text{ OR } << \\ C_{11}; \text{ whichever is smaller,} \end{cases}$$

where:
$E_0 = C_8(O+C_6) - C_9(F+C_7) =$ current error signal,
$O =$ order or reference signal,
$F =$ sensed parameter signal or feedback signal,
$E_{-1} =$ previous error signal, $I_{-1} = C_3C_5 \sum_{n=0}^{n=-N} (C_{12})^{|n-1|} E_{n-1} =$ previous integral component, and where
N = number of previous cycles,
n = the integral cycle, where n = −1 is the most recent previous cycle, and n = 0 is the current cycle,
CS = controlling signal,
$C_1 =$ constant of proportionality for controlling signal,
$C_2 =$ proportional component sizing factor,
$C_3 =$ integral component sizing factor,
$C_4 =$ derivative component sizing factor,
$C_5 =$ error sizing factor to the integral component,
$C_6 =$ order signal offset addend,
$C_7 =$ sensed parameter signal offset addend,
$C_8 =$ order signal sizing factor,
$C_9 =$ sensed parameter signal sizing factor,
$C_{11} =$ maximum controlling signal level, and
$C_{12} =$ previous integral component sizing factor.

It is therefore an object of the present invention to provide a P-I-D control system which is easily and inexpensively adapted for a variety of applications.

It is another object of the present invention to provide a P-I-D control system which can preprocess an error signal prior to forming a driving signal, or which can postprocess a driving signal prior to supplying it to the control element being driven.

These and other objectives, features, and advantages of the present invention will be more readily understood upon consideration of the following detailed description of the invention and accompanying drawings.

BRIEF DESCRIPTION OF THE DRAWINGS

FIG. 1 is a schematic illustration of a controller structured in accordance with the present invention as applied to a mechanical control system.

FIGS. 2A and 2B provide a flow diagram of the signals as they proceed through the steps of the method of the present invention.

FIG. 3 is a graphic illustration of the manner in which the various signals in the present invention interact to achieve a final output signal to the controlled device.

DESCRIPTION OF THE PREFERRED EMBODIMENT

Referring now to FIG. 1, the preferred embodiment of the present invention includes a microprocessor 10 (or alternatively a general purpose computer), which executes a controlling program. A memory 12 is provided which is capable of retaining various data for the program and the program itself. Memory input device 13 permits the user to input information into memory 12, and can, for example, be a keyboard or an array of switches. Timing device 14 initiates and times update cycles and the sampling rate of the system. Analog to digital converters 16 and 18 convert a feedback signal from the parameter being sensed and an order signal from the user, respectively, into a digital form which can be operated upon by microprocessor 10. Signal conditioner 20 receives a driving signal from microprocessor 10 and converts it into a form which is usable by the device being controlled, controlling element 22.

It is to be understood that while memory 12 is shown in FIG. 1 as a number of distinct blocks, memory 12 can be a single physical memory where the various information is stored at different addresses.

As discussed generally above, the preferred embodiment of the present invention can be modelled as follows:

$$CS = \begin{cases} C_1 [C_2 E_0 + C_3 (C_5 E_0 + C_{12} I_{-1}) + C_4 (E_0 - E_{-1})] \\ >> \text{OR} << \\ C_{11}; \text{ whichever is smaller,} \end{cases}$$

where:
$E_0 = C_8(O + C_6) - C_9(F + C_7) =$ current error signal,
$O =$ order or reference signal,
$F =$ feedback or sensed parameter signal,
$E_{-1} =$ previous error signal, $$I_{-1} = C_3 C_5 \sum_{n=0}^{n=-N} (C_{12})^{|n-1|} E_{n-1} = \text{previous integral component,}$$

and where
$N =$ number of previous cycles,
$n =$ the integral cycle, where $n = -1$ is the most recent previous cycle, and $n = 0$ is the current cycle,
$CS =$ controlling signal,
$C_1 =$ constant of proportionality for controlling signal,
$C_2 =$ proportional component sizing factor,
$C_3 =$ integral component sizing factor,
$C_4 =$ derivative component sizing factor,
$C_5 =$ error sizing factor to the integral component,
$C_6 =$ order signal offset addend,
$C_7 =$ sensed parameter signal offset addend,
$C_8 =$ order signal sizing factor,
$C_9 =$ sensed parameter signal sizing factor,
$C_{11} =$ maximum controlling signal level, and
$C_{12} =$ previous integral component sizing factor.

The present inventinn will be more readily understood by considering the above expression in conjunction with FIG. 1.

Input Signals (O and F)

The inputs signals to the microprocessor 10 are digital signals from analog to digital converters 16 and 18, which are digitized representations of the feedback signal, F, from the process or machine being controlled, and of the user-supplied order signal, O, or reference signal. The feedback signal can originate from a sensor 24, such as a position sensor or thermometer. The order signal can be provided by way of a order device 30, such as a joy stick, a potentiometer, or a keyboard. When a keyboard is used, analog to digital converter 18 can be replaced by a decoder, for example, since the signal from the keyboard will already be in digital form.

As can be seen from FIG. 1, in accordance with the present invention, addition functions 26 and 28 are provided so that the signals from the order device 30 and sensor 24 can have a constant added to (or subtracted from) them. This results in an offset from the actual input signal which is reflected in the controlling signal, CS. As such, the position of the controlled device follows the ordering device with a constant difference. Such an offset is useful in applications such as the controlling of a process which requires temperatures a fixed number of degrees higher than the standard process provides.

In the preferred embodiment of the present invention, the addition functions 26 and 28, as well as the others shown in FIG. 1, are executed as a part of the operation of the microprocessor 10.

In accordance with the present invention, the order and the feedback signals can also be multiplied by constants to make them larger or smaller than the actual input signals. Multipliers 32 and 34 receive the constants, $C_9$ and $C_8$, respectively, from memory and multiply them with the feedback signal and order signal, respectively. In this way, a small motion by the ordering device 30 can cause a very large, or even smaller, motion of the controlled device 22. Thus, where the ordering device 30 provides a signal range which is not directly compatible with the driving signal requirements of the device 22 being controlled, constant $C_8$ can be used to make the appropriate adjustments. Similarly, when the sensor 24 provides a signal level which is too large or too small given the sensitivity of the control system, appropriate adjustments can be made via $C_9$.

In the preferred embodiment of the present invention, multipliers 32 and 34 are provided by operation of microprocessor 10.

A switch 36 is provided to permit the source of the order signal to be selectable as either the ordering device 30 or memory 12. In position 38 of switch 36, the order signal originates from the ordering device 30 so that the process or machine is controlled to follow the directions of an operator provided in real time. In position 40, the order signal originates from memory 12 so that the process or machine is controlled to operate at a predesignated condition, $C_{10}$. It follows that the contents of memory 12 can be changed easily to provide a variable setpoint capability to the control system of the present invention.

Switch 43 is provided to permit the value stored for $C_1$, in memory 12 to originate from position sensor 24. This permits the process or condition being controlled to be restored to a previously designated operating condition.

A switch 42 is provided to select the source of the feedback signal as either from the position sensor 24, which provides the actual position of the controlled object, or from memory 12, which can contain a value of zero. With a feedback value of zero, the system will be in the "Rate Control" mode. In this mode, the output from the system is approximately proportional to the ordering signal (less corrections by the integral and derivative components of the system). Switches 44 and 46 are also provided so that, in th Rate Control mode, $C_3$ and $C_4$ may be set to zero to eliminate variable errors from the integral and derivative components of the system.

It is to be understood that in the preferred embodiment, switches 36, 42, 43, 44, and 46 are implemented and controlled within the controlling program.

Error Siqnals ($E_0$ and $E_{-1}$)

Following the preprocessing of the feedback and order signals, the modified feedback signal, $F^*$, is subtracted from the modified Order signal, $O^*$, in the summer 45 to provide the error signal. The error term for the current update cycle will be designated herein as $E_0$, and the error term from the previous cycle as $E_{-1}$.

Proportional ($C_2E_0$)

The error signal is multiplied in multiplier 47 by a constant, $C_2$, to provide the proportional signal component. Constant $C_2$ is stored in memory 12. This proportional signal component may be sufficient to operate simple systems. In such an application, the constants $C_3$ and $C_4$ in the integral and differential signal components can be set to zero by way of switches 44 and 46, to provide a simple follower system where the controlled device closely follows the order signal.

Integral ($C_3 \int Edt$)

The integral signal is generated by taking the output of the previous integral signal ($I_{-1}$) and adding it in summer 48 to part of the current error term ($E_0$). In the approximation used by FISHBECK, the error signal is multiplied by itself a certain number of times each second and divided by the number of times each second that the controller sends out a signal.

In the present invention, by way of contrast, current error term $E_0$ is reduced proportionally by a constant, $C_5$, and is added to modified previous integral signal $C_{12}I_{-1}$ to give the current integral signal, $I_0$. Multiplier 49 and summer 48 provide the respective multiplication and addition functions. The current integral signal, $I_0$, is then multiplied by $C_{12}$ and stored in memory to become $I_{-1}$ in the next cycle.

Constant $C_5$ controls the rate that the integral signal builds up. When current error term $E_0$ becomes zero, the integral signal will no longer build up, but will remain at its current value. The previous integral signal, $I_{-1}$, is multiplied in multiplier 50 by a constant, $C_{12}$, which may be either 1 or slightly less than 1 to cause the stored integral signal to be varied in each update cycle of the present invention. The current integral signal, $I_0$, is finally multiplied in multiplier 52 by a constant, $C_3$, and summed in summer 54 with the proportional and derivative signal components. Constant $C_3$ is a sizing constant which can be employed to vary the effect of the integral term upon the overall controlling signal.

In this way, every time that the timing device cycles, a portion of the current error signal is added to the previous integral signal to generate an ever-increasing controlling signal, so that the modified feedback signal $F^*$ is urged to the same value as the modified Order signal $O^*$.

As the integral component is formed, $C_{12}$ oprrates to control the shape of the integral formation. For example, if $C_{12}$ is other than 1, the $I_{-1}$ component changes exponentially. This effect can be seen in the following model of the integration operation:

$$I_{-1} =$$

-continued
$$C_3 C_5 \sum_{n=0}^{n=-N} (C_{12})^{|n-1|} E_{n-1} = \text{previous integral component,}$$

and where
N=number of previous cycles,
n=the integral cycle, where n=−1 is the most recent previous cycle, and n=0 is the current cycle.

When the current error reaches zero, the current integral signal, $I_0$, will no longer be increasing, but will still provide a stable controlling signal output to hold the error at zero. If the system overshoots, error signal E will change sign. The value of the error term times constant $C_5$ will have an opposing sign when added to the previous integral signal $I_{-1}$ in memory, thereby decreasing the value of the Integral Signal.

Derivative ($C_4(dE/dt)$)

The derivative term reflects the rate at which the error signal is changing. To reduce overshoot, it is usually applied in the negative direction to provide some slowing of the controlled device as it approaches the zero error point. Since it is more difficult to achieve an actual derivative, an approximation is made by taking the difference in errors from one update cycle of the control system to the next.

The previous error term, $E_{-1}$, recorded during the previous cycle, is subtracted in summer 56 from the current error term to provide this approximation of a time derivative. This difference is multiplied in multiplier 58 by a constant, $C_4$, to give the level of effect desired, and summed with the proportional and integral components in summer 54. This term provides the additional benefit that if the error is still increasing because of an unexpected load on the system, the derivative error term will be additive and will increase the magnitude of response of the system.

Controlling Signal ($C_1(C_2E + C_3\int Edt - C_4(dE/dt))$)

The algebraic sum of the proportional signal plus the integral signal minus the derivative signal is the controlling signal. It is desirable that this signal be increased or decreased by a constant, $C_1$, so that it is appropriate to the device being controlled. This is accomplished in multiplier 60.

It also may be desirable that the signal be compared with a maximum signal level, $C_{11}$, stored in memory 12. If the signal is greater than the maximum signal $C_{11}$, then microprocessor 10 substitutes the value of $C_{11}$ for that emerging from multiplier 60. This will prevent an excessively large signal from overloading or overdriving the controlled device 22. An "IF/THEN" decisional operation is a well known computer programming function and will not be described further herein.

It is often the case that a controlled device, be it electrical, hydraulic, pneumatic, or other, needs a signal having some unique characteristic to control it. Signal conditioner 20 is provided to transform the output of signal limiting block 62 into a form that the controlled device will respond to properly.

Referring now to FIG. 3, signal waveforms are illustrated which are present during the operation of the update cycles of the present invention. The vertical scale of each graph represents the magnitude of the particular signal being illustrated. The horizontal scale of each graph is divided into six update cycles, with each update cycle being labeled by a number positioned in the center of the cycle.

The left hand portion of the figure (Scenario One) illustrates a scenario where the machine or process is ordered to move from its existing condition to a new desired condition. In update cycle 1, the order signal, graph 64, is changed to reflect the new condition sought to be achieved. In this example, it is assumed here that there is no modification to the order or feedback signals using constants $C_6$-$C_9$. The current condition of the machine or process parameter being controlled is reflected in the feedback signal, graph 66. The change in error produced by the controlling signal appears in update cycle 2.

Graph 68 illustrates the error signal, $E_0$, formed when the feedback signal is subtracted from the order signal. Graph 68 also illustrates the proportional signal. It is to be noted that because the proportional signal is proportional to the error signal, the same graph is used to illustrate the two signals. It is also to be understood that the relative magnitudes of the two signals may differ, although they will vary in the same manner. In cycle 1, because the feedback signal is zero, the error signal, and hence the proportional signal, will be proportional only to the order signal.

Graph 70 illustrates the integral signal. In cycle 0, the integral signal is zero, so when this previous value is added to the current error signal in cycle 1, the integral signal for cycle 1 is proportional to the error signal, although reduced in size by a constant.

Graph 72 illustrates the derivative signal. In cycle 1, the previous error signal of cycle 0, $E_{-1}$, was zero, so when it is subtracted from current error signal $E_0$, a large derivative signal is generated. Note that at this point, the derivative signal is proportional only to the order signal.

The derivative signal generated in cycle 1 indicates that the error signal is rapidly growing larger. As such, this large derivative signal will be added to the other two error signals to increase the size of the controlling signal, graph 74, and to make the system try to restore itself even faster than it would without a derivative signal.

During cycle 2, the controlling signal will have moved the controlled device closer to that desired by the order signal, so the current error signal will have decreased. This is because the feedback signal is now non-zero. The proportional signal will therefore be smaller in direct proportion to the current error signal.

The previous integral signal, from cycle 1, will be added to the current error signal to give a larger current integral signal.

As such, the current error signal will have decreased versus the previous error signal, graph 68 - cycle 1, so thtt the derivative signal will now be negative. It is added to the other two error signals to reduce the controlling signal in proportion to the rate at which the current error signal is approaching zero. This will reduce the probability of overshoot as the feedback signal approaches the order signal.

In cycle 3, the cycle which precedes the point where the feed back signal equals the order signal, the conditions will be similar. The proportional signal will be smaller while the integral signal will increase further to compensate for the continuing offset. The derivative signal, being negative, indicates that the controlled device is still approaching the ordered setpoint, although at a slower rate, so a smaller derivative signal is subtracted in the formation of the controlling signal to reduce the magnitude of the controlling signal. It is to be noted that the derivative signal remains negative until the ordered setpoint is reached.

When the controlled device reaches the position directed by the order signal, cycle 4, the current error signal and the proportional signal are both zero. The integral signal is at its largest value, since it is an accumulation of the previous errors up to this point. The controlling signal thus will be nonzero and the controlled device will continue to be driven. The derivative signal continues to offset a portion of the integral signal, thus slowing the rate at which the controlled device is driven.

Ideally, all three error signals would approach zero simultaneously giving a zero controlling signal. However, if the integral term is large enough, or if there is an inertial component in the device being controlled, overshoot is possible.

Cycle 5 illustrates such overshoot. As such, the proportional signal changes sign. This reduces the integral signal. The derivative signal also continues to resist the direction of motion of the controlled device. The proportional signal and the derivative signal act together in this case to offset the integral signal, which would be steadily reduced each following cycle.

If the three signals are correctly sized, the controlled device should settle down at the ordered setpoint with no offset and no velocity. If there were a persistent offset, the integral should build up to correct for it. The present invention, by providing the ability to insert additive and proportionalizing factors at various points in the formation of the controlling signal, greatly enhances the ability of the control system designer in correctly sizing each of the signals.

The right side of FIG. 3 (Scenario Two) illustrates an alternate situation, where something has suddenly thrown the process or machine off the ordered setpoint. In cycle 1, the feed back signal indicates a change in the state of the condition being controlled. With the order signal assumed to be zero, the error signal is directly proportional to the magnitude of the feedback signal. The proportional signal is thus proportional to the feedback signal and acts to restore the controlled device to the correct value. The integral signal is still small, but the derivative signal is quite large. This is because of the rapid increase from no error to some error. This would make all three signals try to restore the controlled device to the correct value.

In the cycle 2, as the controlled device moves toward the setpoint, the proportional signal is reduced in size. The integral signal builds up because of the continuing offset, but the derivative signal senses the motion toward the setpoint and acts oo reduce the controlling signal to slow the approach to zero.

In the cycle 3, there is still some difference between the order signal and the feedback signal. This would cause a nonzero proportional signal. The integral signal is buidding up, although at a slower rate. The derivative signal continues to resist the return to zero of the current error signal, but this resistance lessens as the approach is slowed.

When the order and the feedback signals are again the same, the current error signal and the proportional signals are both be zero. The integral signal is again at its maximum, while the derivative signal gets smaller as the approach slowed. There again might be an overshoot, but by setting the value of the constants properly for the system, the overshoot will be small, and the system should settle down with zero offset.

FIGS. 2A and 2B provide a flow diagram of the operation of the present invention as embodied in a computer based control system. The start of the cycle is initiated by timing device 14.

The timing device signals the order device 30 and the sensor 24 to provide data which is representative of user input and the condition being monitored, respectively. If either or both of these signals are in analog form, they are converted into digital form in analog-to-digital converters 16 and 18.

At the start of the cycle, it is determined in step 100 whether the modified order signal, O*, is to originate from the order device or $C_{10}$, the preset order signal. If the latter, $C_{10}$ is retrieved from memory 12 and the modified order signal is set equal to the retrieved value in step 102.

If, in step 100, the modified order signal is to originate from the user, the data from the order device 30 is requested. Constants $C_6$ and $C_8$ are retrieved. The data is offset by $C_6$ and the result is multiplied by $C_8$, assuming that these constants are nonzero. The modified order signal is then set equal to the result, step 104.

In the next step, step 106, it is determined if $C_{10}$ is to be set equal to the current data (actual feedback signal) from sensor 30. If yes, step 108 is executed to perform such retrieval and storage.

Either way, step 110 is next executed to determine if an actual or a zero feedback state is to be used as the modified feedback signal, F*. Step 112 is executed if the actual feedback signal is to be used. In this step, data is retrieved from sensor 24, and constants $C_7$ and $C_9$ are retrieved. The data is offset by $C_7$ and the result multiplied by $C_9$. The modified feedback signal is then set equal to result. Otherwise, step 114 is executed in which the modified feedback signal is set equal to zero to provide a "Rate Control" mode of operation.

Adding $C_6$ to the data from order device 30 makes the value of the order signal different from the original order signal by a constant amount. Adding $C_7$ to the data from sensor 24 gives the feedback signal a similar offset.

Multiplying the data from order device 30 by $C_9$ causes the order signal to be proportionally larger or smaller than the change in the data from the order device. Similarly, the change in the feedback signal can be made proportionally larger or smaller by multiplying the data from sensor 24 by $C_9$.

In step 116, the error signal is formed by subtracting the modified feedback signal from the modified order signal.

In step 118, the proportional signal formed by multiplying the current error signal by the constant $C_2$ is sent to the controlling signal summer 54.

Steps 120 and 122 form the derivative signal. In step 120, the previous error signal $E_{-1}$ is retrieved from memory 12, the current error signal $E_0$ is stored in memory 12 for use in the next update cycle, and constant $C_4$ is retrieved. In step 122, the derivative signal is set equal to $C_4(E_0-E_{-1})$. This operation gives an approximation of the rate of change of the Error Signal. $C_4$ sets the size of the derivative signal with respect to the proportional and integral signals.

The integral signal is formed in steps 124, 126, 128 and 130. In step 124, $C_3$, $C_5$, $C_{12}$ and the previous integral $I_{-1}$ are retrieved from memory 12. In step 126 the current error signal is multiplied by $C_5$ and the previous integral $I_{-1}$ is added to it. $C_5$ gives the size of the increase of the integral with each update cycle. The result of this addition, $I_0$, is multiplied by the value of $C_{12}$ and stored in memory as the new $I_{-1}$, step 128, for use in the succeeding cycle. The new $I_0$ is multiplied by $C_3$ in step 130 to give the integral signal. $C_3$ sets the size of the integral signal with respect to the proportional and derivative signals.

In step 132, the proportional, integral and derivative signals are added together to give an intermediate controlling signal CS'. CS' is multiplied by $C_1$ to set the size of the controlling signal. This further intermediate signal, CS", is processed in steps 136 and 138.

Since some devices or systems can be overranged by excessively large controlling signals, the CS" is compared in step 138 with the size of $C_{11}$, where $C_{11}$ represent the maximum level which the controlled device 22 can tolerate without being overdriven. In step 138, if CS" is larger than $C_{11}$, the control signal CS is set equal to $C_{11}$, step 140. If CS" is smaller, CS is set equal to CS", step 142.

Since different types of controlled devices require different types of controlling signals, a signal conditioner is employed in step 144 to put CS into the desired output form.

CS is then applied to the controlled device 22 and the current update cycle ended.

The timing device 14 will periodically initiate a new update cycle sufficiently often to make the controlled device closely follow the order signal.

If the system is desired to operate as a rate-controlled device, the feedback signal is set in step 114 to equal zero. This will make the current error simply the modified order signal. In such an application, constants $C_3$ and $C_4$ would also be set to zero to eliminate the integral and derivative signals.

If there is a certain position or value that is frequently desired of the controlled device, such as a setpoint or a storage position, the controlled device is moved to that position and, by way of steps 106 and 108, the position information from sensor 24 can be placed in memory 12 to be used as constant $C_{10}$ or it can be set from an input device such as a keyboard. When it is desired to send the controlled device to this setpoint, the source of the order signal can be designated as $C_{10}$.

The values of all of the constants can be set by the user via a memory input device 13, such as a keyboard.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

I claim:

1. An improved three element digital control system for controlling a parameter in a machine or process by driving a controlling element, wherein the control system is of the type which senses the parameter to be controlled and provides a sensed parameter signal representative thereof, forms an error signal which is the difference between the sensed parameter signal and an order signal, and forms a driving signal for driving the controlling element which driving signal includes a component which is proportional to said error signal, a component which is proportional to a time integral of said error signal, and a component which is proportional to a time derivative of said error signal, the improvement comprising:

means for preprocessing the sensed parameter signal or the order signal that form the error signal prior to forming the driving signal.

2. The apparatus of claim 1, wherein the preprocessing means include means receiving the sensed parameter signal for offsetting the sensed parameter signal by a designated offset value.

3. The apparatus of claim 2, wherein the preprocessing means further include means coupled to the offsetting means for multiplying the offset sensed parameter signal by a designated proportional value.

4. The apparatus of claim 2, further including means for storing the designated offset value and for supplying the designated offset value to the offsetting means.

5. The apparatus of claim 3, further including means for storing the designated proportional value and for supplying the designated proportional value to the offsetting means.

6. The apparatus of claim 1, wherein the preprocessing means include means receiving the order signal for offsetting the order signal by a designated offset value.

7. The apparatus of claim 6, wherein the preprocessing means further include means coupled to the offsetting means for multiplying the offset order signal by a designated proportional value.

8. The apparatus of claim 6, further including means for storing the designated offset value and for supplying the designated offset value to the offsetting means.

9. The apparatus of claim 7, further including means for storing the designated proportional value and for supplying the designated proportional value to the offsetting means.

10. The apparatus of claim 1, wherein the parameter is sensed and a sensed parameter signal is provided a predetermined number of times over a sampling cycle, and wherein a series of error signals is formed, each of which corresponds to each of the sensed parameter signals provided during the sampling cycle, further including means for forming the component proportional to the time integral of the error signal comprising means for summing an error signal from the series of error signals with a previous sum signal to provide a current sum signal which current sum signal is the component proportional to the time integral of the error signal;

means coupled to the summing means for multiplying the current sum signal by a designated proportionality factor to provide a proportionalized signal; and means coupled to the summing means and to the multiplying means for storing the proportionalized signal and for supplying said proportionalized signal to the summing means as the previous sum signal to be summed with an subsequent error signal in the series of error signals in forming a subsequent current sum signal.

11. The apparatus of claim 10, further including means for multiplying the current sum signal by a sizing signal and for supplying the sized current sum signal as the component proportional to the time integral of the error signal.

12. The apparatus of claim 1, further including means for postprocessing the driving signal prior to supplying the driving signal to the controlling element.

13. The apparatus of claim 12, wherein the controlling element becomes overdriven above a predetermined level, and further wherein the postprocessing means include means for sensing the level of the drive signal; and means for substituting a designated drive signal when the drive signal exceeds the predetermined level.

14. An improved three element digital control system for controlling a parameter in a machine or process by driving a controlling element, wherein the control system is of the type which senses the parameter to be controlled and provides a sensed parameter signal representative thereof, forms an error signal which is the difference between the sensed parameter signal and an order signal, and forms a driving signal for driving the controlling element which driving signal includes a component which is proportional to said error signal, a component which is proportional to a time integral of said error signal, and a component which is proportional to a time derivative of said error signal, the improvement comprising:

means for storing a plurality of constant values;

means for adding certain of said values to said components; and means for multiplying certain of said components by said values, whereby said parameter of said machine or process is controlled more precisely.

15. The apparatus of claim 14, further including means for initiating a controlling operation on a periodic basis with a timing signal.

16. The apparatus of claim 15, further comprising means for comparing said controlling signal to a maximum constant value and coupling the greater of said controlling signal or said maximum constant value to correct said error.

17. The apparatus of claim 14, wherein the adding means and the multiplying means operate on said components to provide a controlling signal formed in accordance with the formula $$CS = \begin{cases} C_1 [C_2 E_0 + C_3 (C_5 E_0 + C_{12} I_{-1}) + C_4 (E_0 - E_{-1})] \\ >> \text{ OR } << \\ C_{11}; \text{ whichever is smaller,} \end{cases}$$

where:

$E_0 = C_{10} - C_9(F + C_7)$, and $CS$ = controlling signal, $C_1$ = constant of proportionality for controlling signal, $C_2$ = proportional component sizing factor, $C_3$ = integral component sizing factor, $C_4$ = derivative component sizing factor, $C_5$ = error sizing factor to the integral component, $C_{10}$ = order signal setpoint value, $C_{11}$ = maximum controlling signal level, $C_{12}$ = previous integral component sizing factor, $E_{-1}$ = previous error signal, $I_{-1}$ = previous integral component, and $F$ = sensed parameter signal.

18. The apparatus of claim 17 which further comprises means for changing said constant values.

19. The apparatus of claim 17, further wherein $$E_0 = \{C_8(O+C_6) - C_9(F+C_7)\}$$

where
- $O$ = order signal,
- $C_6$ = order signal offset addend,
- $C_7$ = sensed parameter signal offset addend,
- $C_8$ = order signal sizing factor, and
- $C_9$ = sensed parameter signal sizig factor.

20. An improved method for controlling a machine or process of the type which senses a parameter to be controlled and supplies a feedback signal representative thereof, forms an error signal which is a difference signal between said feedback and an ordered signal, and forms a controlling signal from the error signal which includes a proportional component which is proportional to said error signal, an integral component which is proportional to a time integral of said error signal, and a derivative component which is proportional to a time derivative of said error signal, and further wherein the controlling signal drives a controlling device to minimize said error signal, wherein the improvement further comprises the steps of:

storing a plurality of constant values;

adding certain of said values to said components of said error signal; and multiplying certain of said components by said values, whereby said machine or process is controlled more precisely.

21. The method of claim 20, further comprising the step of initiating the improved method on a periodic basis with a timing signal.

22. The method of claim 20, further comprising the step of comparing said controlling signal to a maximum constant value; and supplying the greater of said controlling signal or said maximum constant value as the controlling signal to correct said error.

23. The method of claim 20, wherein the controlling signal is formed in accordance with the formula $$CS = \begin{cases} C_1 [C_2E_0 + C_3(C_5E_0 + C_{12}I_{-1}) + C_4(E_0 - E_{-1})] \\ >> \text{OR} << \\ C_{11}; \text{whichever is smaller,} \end{cases}$$

where:
- $E_0 = C_{10} - C_9(F+C_7)$, current error signal,
- $E_{-1}$ = previous error signal,
- $I_{-1}$ = previous integral component,
- $O$ = order signal,
- $F$ = feedback signal,
- $C_1$ = constant of proportionality for controlling signal,
- $C_2$ = proportional component sizing factor,
- $C_3$ = integral component sizing factor,
- $C_4$ = derivative component sizing factor,
- $C_5$ = previous error sizing factor,
- $C_{10}$ = order signal setpoint value,
- $C_{11}$ = maximum controlling signal level, and
- $C_{12}$ = previous integral component sizing factor.

24. The method of claim 23, further including the step of changing said constant values.

25. The method of claim 23, wherein the error signal is formed in accordance with the formula $$E_0 = \{C_8(O+C_6) - C_9(F+C_7)\}$$

where:
- $O$ = order signal.
- $C_6$ = order signal offset addend,
- $C_7$ = feedback signal offset addend,
- $C_8$ = order signal sizing factor, and
- $C_9$ = feedback signal sizing factor.

26. A method for controlling a machine or process, wherein a reference signal is provided which is representative of a desired condition of the machine or process, and wherein a parameter is monitored which is representative of the actual condition of the machine or process, and further wherein a timing signal is provided, the method comprising a cycle of steps executed periodically and in synchronization with the timing signal to generate a controlling signal, and further wherein a current cycle of steps operating in part upon values and signal obtained from a previous cycle of steps, each cycle of steps comprising the steps of:

(a) adding to said reference signal a first constant to form a first modified reference signal;

(b) multiplying said first modified reference signal by a second constant to form a second modified reference signal;

(c) measuring the parameter of the machine or process;

(d) adding a third constant to said measured parameter to form a first modified measured parameter;

(e) multiplying said first modified measured parameter by a fourth constant to form a second modified measured parameter;

(f) subtracting said second modified measured parameter from said second modified reference signal to form a current error signal representing an error in operation of said machine or process;

(g) multiplying said error signal by a fifth constant to form a proportional signal;

(h) multiplying said error signal by a sixth constant to form a first value;

(i) forming a second value by multiplying a first previous integral signal of the previous cycle of steps by an eighth constant;

(j) adding the second value to said first value to form a third value;

(k) multiplying a seventh constant by said third value to form a current integral signal;

(l) subtracting a previous error signal of said previous cycle from said current error signal to form a fourth value;

(m) multiplying said fourth value by a ninth constant to form a current derivative signal;

(n) adding said proportional signal, current integral signal and said current derivative signals to form fifth value;

(o) multiplying said fifth value by a tenth constant to form the controlling signal;

(p) comparing said controlling signal with a maximum signal set by an eleventh constant; and (q) supplying as the controlling signal said controlling signal or said maximum signal, whichever is smaller.

* * * * *